United States Patent [19]

London

[11] Patent Number: 5,702,245
[45] Date of Patent: Dec. 30, 1997

[54] CONVEYOR FOR PROCESSING EQUIPMENT HAVING GAS FLOW COMPENSATION

[75] Inventor: Eugene J. London, Sandusky, Ohio

[73] Assignee: Stein, Inc., Toledo, Ohio

[21] Appl. No.: 618,552

[22] Filed: Mar. 20, 1996

[51] Int. Cl.$^6$ ............................. A47J 37/00; A21B 1/00; F24C 15/32; F24D 1/00
[52] U.S. Cl. .......................... 432/14; 34/75; 34/78; 99/355; 99/443 C; 99/476; 99/479; 62/381; 126/21 A; 198/778; 198/833; 432/58; 432/133; 432/138
[58] Field of Search .................... 99/352–355, 477–479, 99/443 R, 443 C, 386; 126/21 A, 21 R; 198/778, 833; 34/75, 78, 147; 62/381; 432/14, 15, 58, 133, 134, 138; 426/474, 506, 520, 524

[56] References Cited

U.S. PATENT DOCUMENTS

| | | | |
|---|---|---|---|
| 2,011,247 | 8/1935 | Jourdan | 99/443 C |
| 3,938,651 | 2/1976 | Alfred et al. | |
| 3,943,842 | 3/1976 | Bills et al. | 99/473 |
| 4,319,460 | 3/1982 | Williams | 62/78 |
| 4,363,263 | 12/1982 | Williams | 99/352 |
| 4,444,553 | 4/1984 | Christodoulou | 432/15 |
| 4,565,282 | 1/1986 | Olsson et al. | 198/778 |
| 4,582,047 | 4/1986 | Williams | 126/369 |
| 4,591,333 | 5/1986 | Henke | 126/21 A |
| 4,603,776 | 8/1986 | Olsson | 198/778 |
| 4,612,911 | 9/1986 | Onodera | 99/477 |
| 4,631,029 | 12/1986 | Lanham et al. | 432/133 |
| 4,726,766 | 2/1988 | Stewart et al. | 426/133 |
| 4,737,373 | 4/1988 | Forney | 426/510 |
| 4,792,303 | 12/1988 | Stewart et al. | 110/248 |
| 4,899,871 | 2/1990 | Olsson | 198/778 |
| 4,941,567 | 7/1990 | Olsson | 198/778 |
| 4,953,365 | 9/1990 | Lang et al. | 62/381 |
| 5,078,120 | 1/1992 | Hwang | 126/21 A |
| 5,109,758 | 5/1992 | Voegtlin | 99/443 C |
| 5,203,256 | 4/1993 | Mueller | 99/476 |
| 5,243,962 | 9/1993 | Hwang | 126/21 A |
| 5,322,007 | 6/1994 | Caridis et al. | 99/443 C |
| 5,329,916 | 7/1994 | Lygum | 432/14 |
| 5,335,590 | 8/1994 | Crump, III et al. | 99/479 |
| 5,346,057 | 9/1994 | Fisher et al. | 198/778 |
| 5,515,775 | 5/1996 | Crump, III et al. | 99/479 |

FOREIGN PATENT DOCUMENTS 2205545  12/1988  United Kingdom .

*Primary Examiner*—Timothy F. Simone
*Attorney, Agent, or Firm*—Oldham & Oldham Co., LPA

[57] ABSTRACT

A processing apparatus, conveyor and method for processing products or materials, such as food processing equipment or methods, is configured such that the conveyor travels in a generally helical path within a processing chamber to expose products on the conveyor to a gaseous processing media such as heated or cooled air. The conveyor includes gas flow compensation including a plurality of gas flow compensation members which partially block a portion of the surface of the conveyor, preferably toward the exterior of the conveyor in the helical path, to deflect or direct more of the gaseous food processing media away from the less densely distributed products or materials at the exterior of the conveyor caused when the conveyor follows the helical path. The processing media is thus preferably forced in the direction of the more densely distributed products toward the interior of conveyor to uniformly expose product on the conveyor to the processing media. Alternatively, the flow compensation members may be configured to direct the flow of the processing media in other predetermined paths, such as counter to the travel direction of the conveyor.

25 Claims, 4 Drawing Sheets

CONVEYOR FOR PROCESSING EQUIPMENT HAVING GAS FLOW COMPENSATION

BACKGROUND AND SUMMARY OF THE INVENTION

The present invention relates generally to new and novel improvements in processing or treatment equipment and methods of processing or treating materials or products. More particularly, the present invention relates to a conveyor arrangement particularly suitable for use in transporting food products through large volume food processing equipment which includes gas flow compensation to control the flow of the gaseous food processing media within the equipment.

Large volume food processing and other processing or treatment equipment has been designed to utilize a spiral conveyor to transport products or materials in a vertically ascending path through a controlled environment to, for example, cook, freeze, dry, clean or otherwise process or treat products or materials. Food processing may include cooking or freezing food products such as, for example, poultry, seafood, pork, beef, dairy, grain, and vegetable based food products. Conveyors of this type are also used in a variety of other processing or treating equipment.

A self-supporting spiral conveyor for use in food processing equipment of this type is shown in U.S. Pat. No. 3,938,651 to Alfred, et al. In this patent, the spiral conveyor system is adapted for use in a freezer structure which is designed to fast-freeze large quantities of food products. The conveyor follows a path consisting of a number of superimposed, helically extending tiers wherein links on either side of the conveyor support the tiers on top of one another to provide a self-supporting conveyor system. Other spiral conveying systems are also known, with the number of superimposed tiers of the conveyor formed by a supporting structure rather than in a self-supporting configuration. In these configurations, the processing equipment uses a treating medium to process materials on the conveyor, which in many cases is forced through the tiers of the conveyor to promote heat transfer as an example. In many cases, the apparatus forces the treatment medium in a generally vertical direction through the tiers of the conveyor or perpendicularly to the products or materials on the conveyor. In general, the vertical flow of the treating medium through the tiers may vary to a great extent due to a variety of causes, in turn causing nonuniform distribution of the treating or processing media and uneven treatment characteristics across the entire width and length of the conveyor.

For large volume processing of food products as an example, such as industrial and commercial cooking and food processing operations, forming the spiral path of the conveyor in a number of superimposed tiers provides a number of distinct advantages. The helical path of the conveyor provides a relatively long processing path without taking up a large area, allowing significantly longer dwell times within the processing equipment. In the processing equipment, food products or other materials are normally placed on the conveyor system when the conveyor is traveling in a straight path. The conveyor then transports the products into a processing chamber and the conveyor bends to form a spiral or upwardly ascending helical path. The conveyor belt in general includes supporting members extending across its width to support a pervious or other belt. These supporting members must articulate into the spiral path as the conveyor enters the processing chamber, and therefore come closer together adjacent the inside diameter of the helical path. Additionally, if the food or other products are initially distributed uniformly across the conveyor as the conveyor is traveling in a straight path, the food products toward the interior of the spiral also get pushed together, or become more densely distributed, while the food products toward the exterior of the spiral become less densely distributed. When a treating medium is passed through the tiers of the helical path generally perpendicular to the conveyor surface, these factors contribute to non-uniform flow of the treating medium. In such processing equipment, it is generally desirable to have all products on the conveyor exposed to the processing environment to substantially the same extent. This is difficult to accomplish based upon the non-uniform distribution of the support members or products or materials being treated across the conveyor as the conveyor transports the products through the processing chamber.

In cooking or freezing operations as an example, temperature control and flow of the treating or processing media are typically very important. For example, when cooking food products, temperature or flow variations are often detrimental to the food products and can result in both undercooking and overcooking of food products on the same conveyor belt. It should also be recognized that while "over freezing" food products to, for example, a minimum temperature of −25° F. may not be detrimental to the food products themselves, some incremental amount of energy is expended or "wasted" in reducing the temperature of such "over frozen" food products from an acceptable freezing temperature, say −5° F., to the −25° F. temperature.

While one could initially distribute the food or other products more densely toward the exterior of the spiral or upwardly ascending helical conveyor, this is typically not desirable because is complicates the product loading operation and may also reduce food product throughput. Other known prior attempts to compensate for the non-uniform flow of a treating medium across the belt include placing openings in the inner and/or outer walls of the conveyor path to allow the treating medium to flow toward and through these openings and distribute the medium across the belt in the plane of the belt in an attempt to make up for flow variations perpendicular to the belt surface. However, such prior attempts to solve the problem posed have not been universally successful.

Accordingly, an object of the present invention is to provide a adaptable and efficient arrangement for a conveyor for food processing equipment having gas flow compensation which is particularly useful in conjunction with large volume food processing equipment.

Another object of the present invention is the provision of a conveyor for processing equipment having gas flow compensation which transports products through a processing environment while providing substantially uniform exposure of the products to a gaseous processing media.

Yet another object of the present invention is the provision of a conveyor for processing equipment having gas flow compensation which can accommodate more dense product distribution toward the interior of a spiral or upwardly ascending helical path and provide substantially uniform exposure of products thereon to a gaseous processing media.

These and other objects of the present invention are attained by providing a conveyor and methods for processing equipment including a plurality of gas flow compensation members which partially block the bottom surface of the conveyor toward the exterior of spiral or upwardly ascending helical processing conveyors and which deflect or direct the gaseous processing media within the processing region, such as away from the less densely distributed products toward the exterior of the conveyor and in the direction of the more densely distributed products toward the interior of conveyor.

Other objects, advantages and novel features of the present invention will become apparent in the following detailed description of the preferred embodiments of the invention when considered in conjunction with the accompanying drawings.

DETAILED DESCRIPTION OF THE PREFERRED EMBODIMENTS

Figure 1:
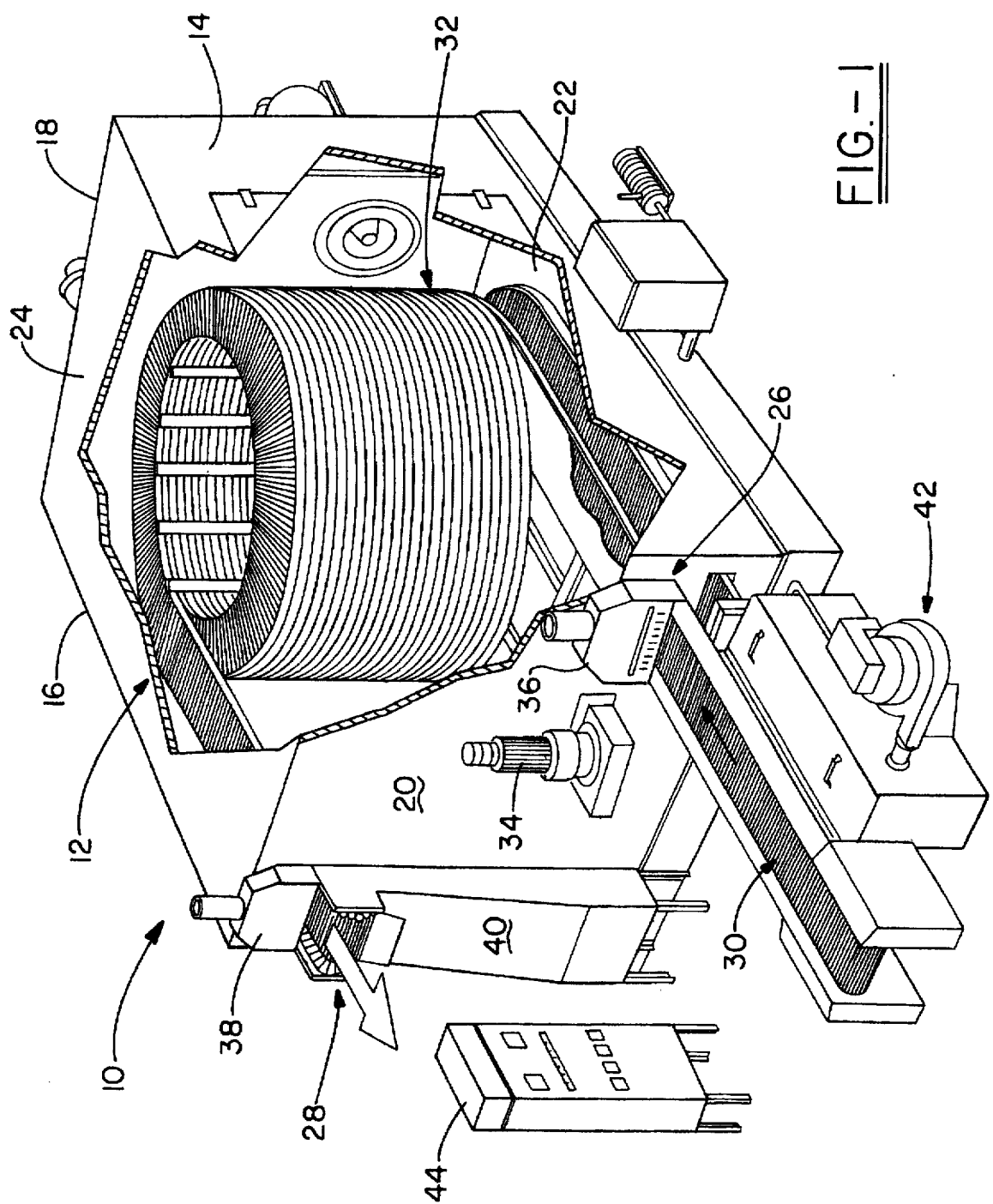
FIG. 1 is an overall perspective view, with portions of the enclosure housing broken away for the purpose of illustration, of an illustrative large volume processing device having a spiral or helically extending conveyor having gas flow compensation in accordance with a preferred embodiment of the present invention.

In the following detailed description of preferred embodiments of the present invention, reference is made to the accompanying drawings which illustrate the preferred embodiments. Referring now to the drawings, in which like-referenced characters indicate corresponding elements throughout the several views, attention is first directed to FIG. 1 which illustrates an overall perspective view, with portions of the enclosure housing broken away for the purpose of illustration, of an illustrative large volume processing machine 10 with a conveyor 30 traveling in a spiral or helically extending path. In FIG. 1, as an illustrative embodiment, the processing device 10, is a cooking oven, a food processing chamber 12 houses the conveyor 30, and includes front wall 14, back wall 16, side walls 18 and 20, floor 22 and top wall 24, which together define a substantially closed housing. An inlet opening 26 and outlet opening 28 formed in at least one of front wall 14, back wall 16 or side walls 18 and 20. Food products are introduced into food processing chamber 12 through inlet opening 26 and are removed from food processing chamber 12 through outlet opening 28.

Endless conveyor 30 is directed into food processing chamber 12 through inlet opening 26 and is designed to carry a large volume of food products which are desired to be cooked in cooking oven 10. Endless conveyor 30 is adapted to follow, at least through part of its length, a path including a plurality of superimposed, upwardly ascending helical tiers which form belt pile 32. The tiers may be circular in shape or elongated or elliptical while still generally following the helical path. Endless conveyor 30 is designed to fully support food products thereon while being pervious to allow a gaseous food processing media to flow readily therethrough. Endless conveyor 30 exits food processing chamber 12 through outlet opening 28 and the processed food products are removed at this point for subsequent processing, packaging or consumption.

A drive motor 34 or other suitable mechanism is utilized to drive belt 30 in a circular path for continuous movement through the helical path. In order to control the escape of the gaseous food processing media from food processing chamber 12 through inlet opening 26 and outlet opening 28, and to control outside air from entering into food processing chamber 12 from the outside through inlet opening 26 and outlet opening 28, exhaust stacks 36 and 38 may be provided at inlet opening 26 and outlet opening 28, respectively. Exhaust stacks 36 and 38 regulate the flow of air through inlet opening 26 and outlet opening 28 and remove gasses exiting the food processing chamber 12. Exhaust stacks 36 and 38 may also be used to exchange a portion of the gaseous food processing media for a fresh supply of the cooking medium to maintain the desired food processing environment within food processing chamber 12. An exhaust vent (not shown) may be provided in top wall 24 and may include an automatically adjustable baffle controlled by a servo-motor to regulate the pressure or cooking environment within food processing chamber 12.

It should be recognized that endless conveyor 30 is arranged to follow a path consisting of a number of superimposed, helically extending tiers, which provides an extremely long path over which the food products are exposed to the gaseous food processing media in a rather compact food processing chamber 12. This allows the dwell time of the food products within food processing chamber 12 to be increased dramatically while not substantially increasing the volume of food processing chamber 12.

Endless conveyor 30 introduces a rather large amount of material into food processing chamber 12 which, in the case of cooking oven 10 shown in FIG. 1, is heated as it travels through food processing chamber 12. It is therefore desirable to maintain the temperature of endless conveyor 30 and the surrounding environment at a relatively high temperature to minimize the energy utilized to heat endless conveyor 30 upon entering food processing chamber 12. Box 40 shields endless conveyor 30 from the outside atmosphere in its return path to reduce heat loss in food processing chamber 12. Box 40 may preferably be insulated to further reduce the extent of heat loss from food processing chamber 12.

On its return path to inlet opening 26, endless conveyor 30 may also pass through a suitable belt cleaning system, generally identified by reference number 42. Control box 46 is provided to monitor the operation of cooking oven 10 and includes controls over various food processing parameters, such as the food processing environment in food processing chamber 12 and the travel speed of endless conveyor 30. The food processing environment in food processing chamber 12 can include, in this example, heat and/or steam, and fans may be utilized to circulate the gaseous food processing media within food processing chamber 12. Cooking oven 10 as described above may be similar in structure to the cooking oven described in U.S. Pat. No. 5,078,120 to Hwang which is hereby incorporated by reference herein. In other types of food or other processing equipment, refrigerated air and/or other types of food processing environments can be introduced and maintained in food processing chamber 12.

A suitable basic conveyor system which allows both straight and curved paths to be followed is described in U.S. Pat. No. 3,938,651 to Alfred, et al. which is incorporated by reference herein. In general, endless conveyor 30 may include a plurality of mutually articulated and interadjustable links forming the two sides of the endless conveyor 30 and a bottom supporting portion interposed between the links wherein the bottom supporting portion may be clothed with a wire or other pervious surface-forming material to provide a supporting plane. In a self-supporting conveyor system, the links are designed as spacers which are arranged to support or be supported by an immediately overlying or underlying tier of endless conveyor 30. In this way, endless conveyor 30 is self-supporting and no separate belt support is needed between the tiers of the spiral or helical upwardly ascending conveying system. As perviously mentioned, the conveyor belt 30 may be supported in other suitable fashions, but in any event the entire volume making up the spiral or helical conveying system is open to the flow of the gaseous processing media therethrough. In the present invention, uniformity of flow of the processing or treatment medium across the width of belt 30 is achieved by flow compensation arrangements to be hereinafter described.

Figure 2:
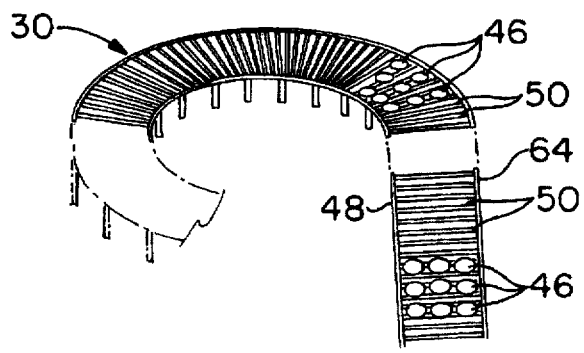
FIG. 2 is a partial perspective view of the conveyor system having gas flow compensation in accordance with the present invention.

Referring now to FIG. 2, the conveyor 30 having gas flow compensation in accordance with a preferred embodiment of the present invention is shown as it transitions from a straight path to a curved or helical path. The conveyor 30 preferably is constructed to include a pervious product supporting surface carried by a number of support members 50 which in turn are carried by spaced apart links 48 and 64. The distribution of food or other products on the conveyor 30 in various areas shows products 46, in this case illustrated as discrete cylindrical objects, distributed substantially uniformly across the width of endless conveyor 30 in the straight portion of belt 30. However, when endless conveyor 30 enters into a curved path or its helical path, links of endless conveyor 30 are "pushed" closer together toward the inside diameter of the curved or helical path and consequently products 46 are also "pushed" together in this region as shown in FIG. 2. Similarly, the links and products spread further apart adjacent the exterior of the helical path as shown.

Figure 3:
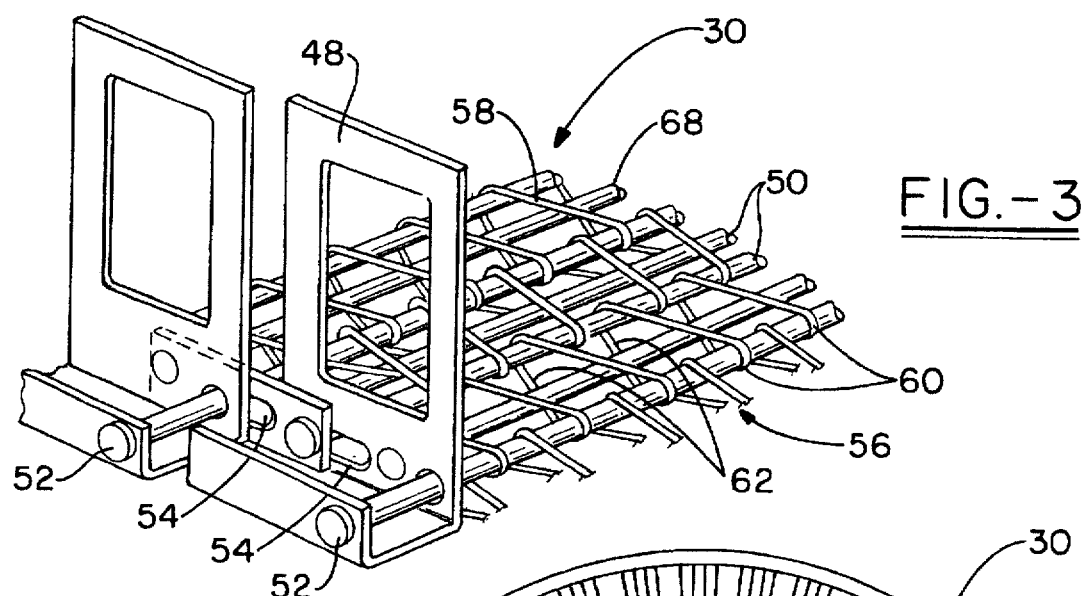
FIG. 3 is a partial perspective view showing a portion of the conveyor according to the invention including a first embodiment of the flow compensation members associated with the conveyor system.

Referring now to FIG. 3, which shows a first embodiment of a particular conveyor having gas flow compensation in accordance with the present invention. The conveyor 30 includes a plurality of gas flow compensation members which form a part of and are carried by the conveyor 30. In this embodiment, endless conveyor 30 may include a series of spaced apart links 48 and 64 as mentioned with respect to FIG. 2 (only external link 64 being shown in FIG. 3), which carry a plurality of supporting rods 50 having enlarged head portions 52. Rods 50 are preferably supported to allow articulation with respect to the link members 48 and 64, and may extend through elongated openings 54 in adjoining links 64 (and/or similar openings in link 48). Elongated openings 54 may be elongated in one or both of adjoining or links 48 or 64 and allows links 48 and 64 to move or slide in the direction of the longitudinal axis of endless conveyor 30, but not in a direction transverse to the longitudinal axis of endless conveyor 30. Between adjacent support rods 50, there is provided a pervious supporting surface which may be formed wire members 56 include top straight portions 58 which extend between adjacent rods 50 and loop portions 60 which go around rods 50 and form an adjacent bottom straight portion 62. Bottom straight portion 62 transitions into another loop portion 60 and forms a second top straight portion 58, with this structure continued across the width of endless conveyor 30.

Figure 4:
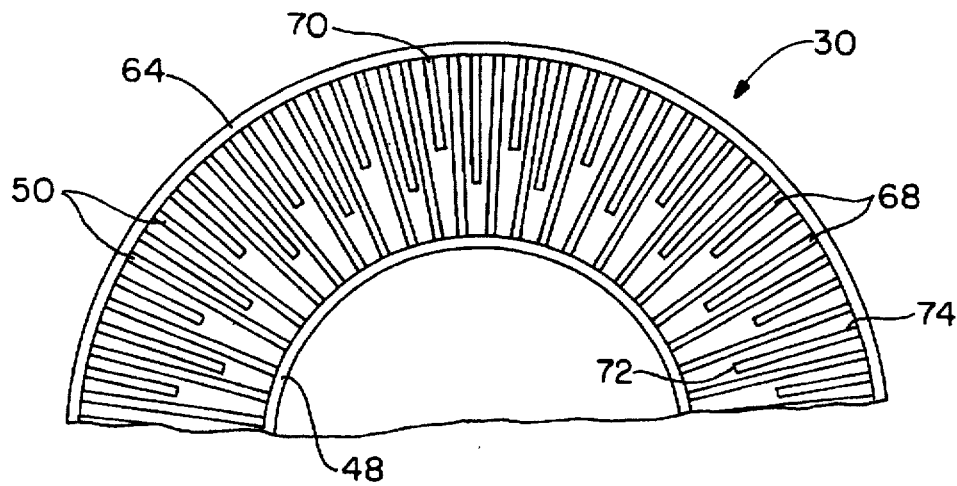
FIG. 4 is schematic top view of the conveyor including gas flow compensation according to the first embodiment of the invention.

Endless conveyor 30 further includes a plurality of gas flow compensation members, in this embodiment gas flow compensation rods 68, which are positioned between top straight portion 58 and bottom straight portion 62 of formed wire members 56. As shown in FIG. 4, gas flow compensation rods 68 are preferably positioned between adjacent rods 50 and extend partially across the width of endless conveyor 30 from the exterior links 64 to block or deflect gaseous processing media in this region. This will for example direct the processing or treatment media from food products 46 positioned toward the exterior of endless conveyor 30 to food products 46 positioned toward the interior of endless conveyor 30. Gas flow compensation rods 68 are preferably anchored to exterior link 64 through opening 70. Flow compensation rods 68 may include enlarged head portions 72 and adjacent threaded portions 74 which are threadably engaged in internal threads in openings 70. The material, diameter and length of gas flow compensation rods 68 is selected to achieve the desired degree of compensation of the gaseous food processing media between food products 46 positioned toward the interior of endless conveyor 30 and food products 46 positioned toward the exterior of endless conveyor 30 to allow food products 46 to be exposed to a substantially uniform degree of the gaseous food processing media while present in food processing chamber 12. Gas flow compensation rods 68 preferably extend between one-third to one-half the way across from external links 64 to internal links 48. The gas flow compensation rods 68 may also vary from positions between adjacent support rods 50 along the length of belt 30, and the particular application or configuration of belt 30 will dictate different arrangements of flow compensation members. The flow compensation members, such as rods 68, obstruct a portion of the space between support rods 50. As should be recognized, when belt 30 travels along the helical path, the space between adjacent support rods 50 also increases toward the exterior if the belt 30, and similarly come closer together toward the interior thereof. The flow of gaseous processing or treatment media generally follow the path of least resistance, which would generally be toward the exterior of belt 30 due to its articulation into the helical path from a straight path. The flow compensation members, and in this embodiment rods 68, cause the path of least resistance to be distributed toward the interior of the belt 30 and uniformly distributes the medium across the belt width as desired.

Figure 5:
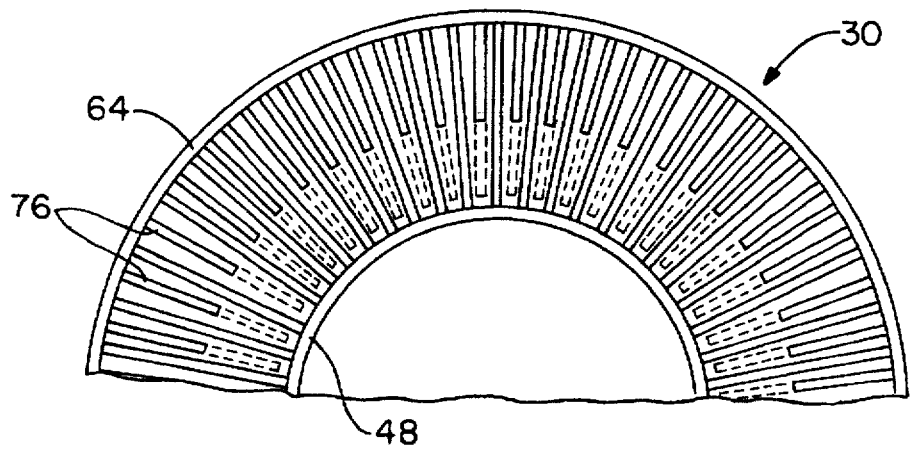
FIG. 5 is schematic top view of the conveyor including gas flow compensation according to a second embodiment of the invention.

Referring now to FIG. 5, a further embodiment of the conveyor system in accordance with the present invention again includes a plurality of gas flow compensation members. In this embodiment, adjustable length gas flow compensation rods 76 may be similarly carried with conveyor 30 to obstruct a portion of the surface area of the conveyor. In the preferred embodiment, rods 76 may extend from the exterior of the spiral toward the interior. The gas flow compensation rods 76 may be secured to adjacent link members of the conveyor similar to rods 68 of the pervious embodiment or in another suitable manner to be carried with the conveyor as it travels through the processing chamber. The rods 76 are preferably tapered, with the material, diameter, length and degree of taper of rods 76 selected to achieve the desired degree of compensation of the gaseous food processing media to equalize and expose products 46 to a substantially uniform degree of the gaseous processing media across belt 30 while present in cooking chamber 12. The gas flow compensation rods 76 are preferably adjustable to extend telescopically between one-third and one-half or more of the way across from external links 64 to internal links 48. This adjustability allows selective control of the flow deflection members 76 for different applications and/or conditions, giving flexibility to the processor.

Figure 6:
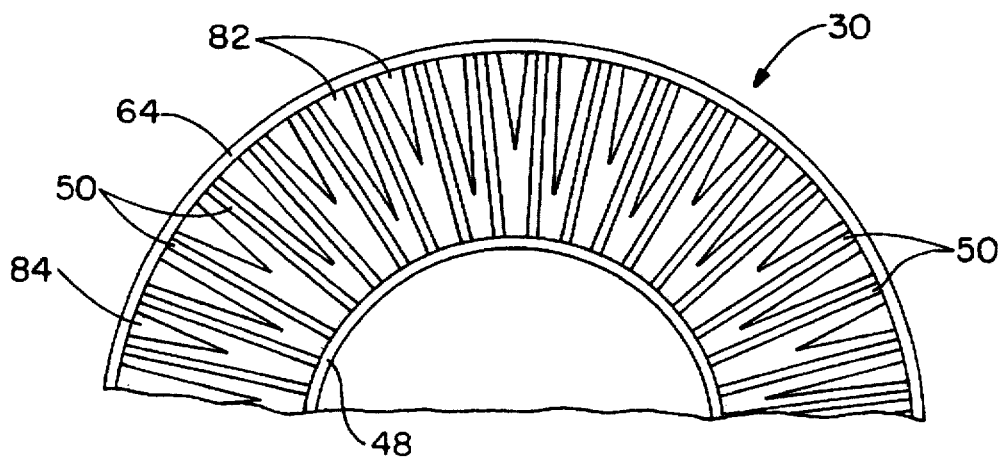
FIG. 6 is schematic top view of the conveyor including gas flow compensation according to a third embodiment of the invention.

Referring now to FIG. 6, a third embodiment of the conveyor in accordance with the present invention has a plurality of gas flow compensation members consisting of tapered gas flow compensation panels carried with the conveyor, preferably toward the exterior of the conveyor 30. The tapered gas flow compensation panels 82 may be formed as relatively thin plates of a metallic material for example. The tapered gas flow compensation panels 82 may have a generally trapezoidal shape with tapered sides which reduce the effective width of tapered gas flow compensation panels 82 as they transition from the exterior of endless conveyor 30 to the interior of endless conveyor 30. Panels 82 may also include openings 84 to allow, for example, a part of the wire mesh forming the conveyor support surface to be pulled through openings 84 secure panels 82 via twisted wire attachments 86 between top straight portions 58 and bottom straight portions 62 in formed wire members 56 between adjacent rods 50. Other securing arrangements are contemplated. The material, thickness, length and degree of taper of tapered gas flow compensation panels 82 is selected to achieve the desired degree of compensation of the gaseous food processing media for a particular belt configuration and application. Gas flow compensation panels 82 may also extend between one-third and one-half or another length across from external links 64 to internal links 48. The panels 82 may be tapered as shown, or could be of other configurations, and could be made to be adjustable similar to the embodiment of FIG. 5.

Figure 7:
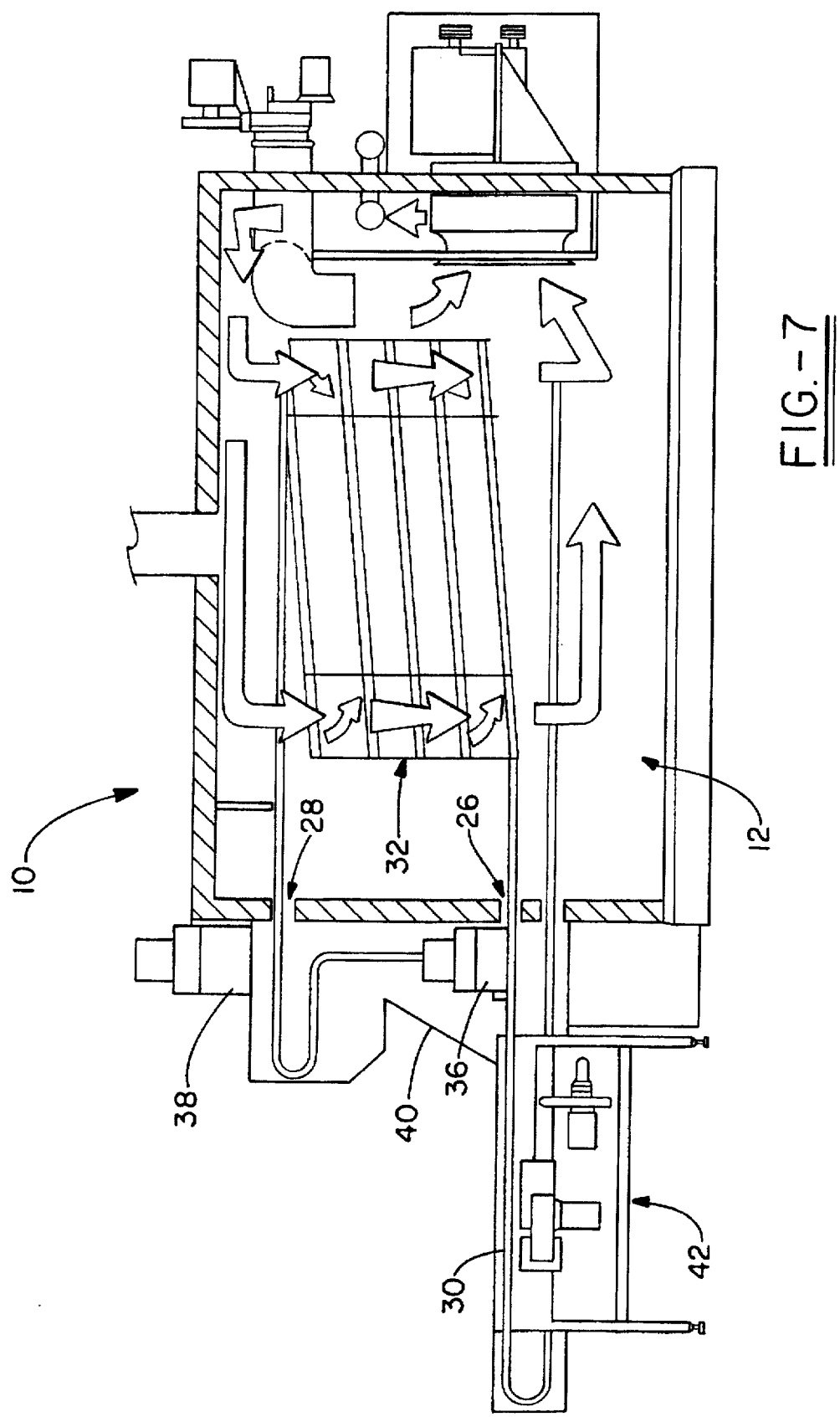
FIG. 7 is a schematic partial cross sectional vies of the processing equipment including the conveyor system and showing the flow of gaseous processing media therein.

In each of the embodiments above, the gas flow compensation devices cause gas to flow from the exterior periphery of the belt tiers toward the interior thereof. As shown in FIG. 7, the gas forced through the belt pile comprising the number of helically extending tiers, tends to migrate toward the exterior of each of the belt tiers due to the heavier loading of the belt at the internal diameter and the closer spacing of support members 50. Providing the gas flow compensation members 68 or 76 displaces an amount of gas flow toward the interior portion of the belt as shown by arrows 85 by effectively blocking a portion of the path through the belt at the outer portions thereof. By restricting the flow through the outer portions of the belt, gas moves inwardly and spreads uniformly throughout the width of the belt.

Figure 8:
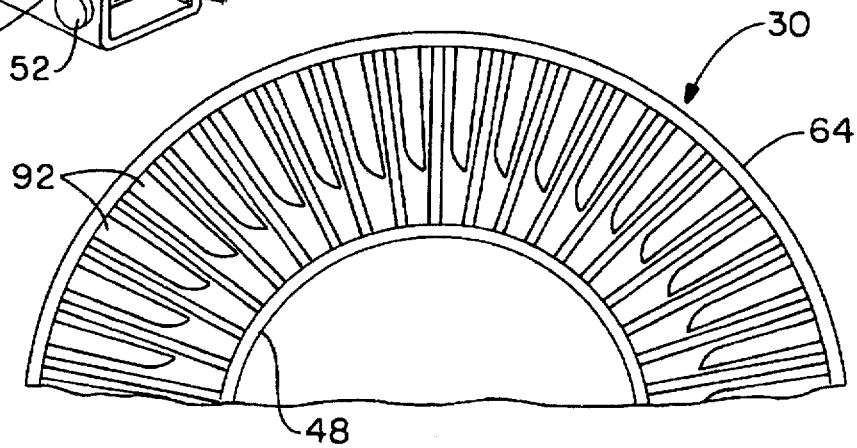
FIGS. 8 and 9 show respectively a schematic top view of the conveyor including another embodiment of the gas flow compensation and a cross section of a flow compensation member according to this embodiment of the invention.
Figure 9:
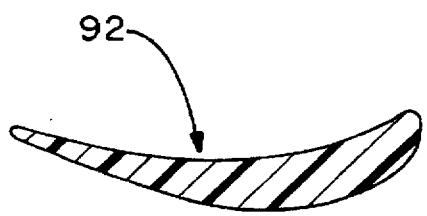

Another embodiment of the conveyor in accordance with the present invention shown in FIGS. 8 and 9 has a plurality of gas flow compensation members consisting of gas flow compensation panels formed into a particular configuration to direct gas flow in a particular manner in the spaces between tiers of the conveyor belt. The flow compensation members may again be carried with the conveyor, preferably toward the exterior of the conveyor 30. The gas flow compensation panels 92 may be formed as relatively thin plates of a metallic material for example which are shaped into an airfoil configuration. The gas flow compensation panels 92 may have a curved profile extending from an outer portion thereof toward an inner portion thereof. The curved profile causes gas impinging on the member 92 to be directed in a direction toward the inner portion of the belt as desired, but also in a direction counter to the rotation of the belt in the tiers. For various applications, it may be desirable to run the conveyor upwardly through the belt stack, while in others the belt travels downwardly through the stack. The belt will thus travel clockwise or counterclockwise in the helically extending path. In forming the compensation members 92 to force an amount of treating gas in a direction counter to the direction of the belt, a natural agitation is created around the products positioned on the belt to increase the heat transfer between the treating gas and the products positioned on the belt. Other flow characteristics may also be achieved by configuring the panels 92 in another form to direct treating gas in a different manner. The members 92 may again have a generally trapezoidal shape with tapered sides which reduce the effective width of tapered gas flow compensation panels 82 as they transition from the exterior of endless conveyor 30 to the interior of endless conveyor 30. The members 92 may be secured in a similar fashion as pervious embodiments or in another suitable fashion. The curvature or other configuration of the members 92 to direct flow of the treating medium between tiers of the belt is selected to achieve the desired degree of counter or other desired flow characteristics for a particular belt configuration and application. Gas flow compensation panels 92 may again extend partially between external links 64 to internal links 48, or may extend the entire length therebetween to effectively control flow of gas across the entire width of the belt. The members 92 in this as well as the other embodiments herein may include apertures to allow a portion of the treating medium therethrough, while still directing the flow of a large amount of gas in the desired manner.

Although the present invention has been described above in detail, the same is by way of illustration and example only and is not to be taken as a limitation on the present invention. For example, the teachings of the present invention could be applied to modify the gas flow compensation members described herein or to design other types of gas flow compensation members. Accordingly, the scope and content of the present invention are to be defined only by the terms of the appended claims.

What is claimed is:

1. A processing apparatus for processing products using a gaseous processing media, said apparatus comprising:

an enclosed processing chamber containing a gaseous processing media, said enclosed processing chamber having an inlet opening and an outlet opening;

an endless conveyor including at least one interior and exterior link member, and having a plurality of support members extending between said interior and exterior link members with a pervious products support surface extending between adjacent support members on which products are placed for processing within said chamber, said conveyor transporting said products from outside said chamber through said inlet opening, through a generally helical path within said chamber to expose the products to the gaseous processing media in said chamber and out of said outlet opening, said conveyor having an exterior and interior portions when traveling in said generally helical path; and a plurality of gas flow compensation members positioned intermediate said support members to deflect a portion of the gaseous processing media from said exterior portion of said conveyor toward said interior portion of said conveyor.

2. The processing apparatus in accordance with claim 1, wherein said pervious products support surface consists of formed wire members having a plurality of top flat portions positioned above said support members, a plurality of bottom flat portions positioned below said rod members and a plurality of loop portions intermediate said plurality of top flat portions and said plurality of bottom flat portions and said plurality of gas flow compensation members are positioned intermediate said plurality of bottom flat portions and said plurality of top flat portions.

3. The processing apparatus in accordance with claim 1, wherein said plurality of gas flow compensation members partially block the space between adjacent support members.

4. The processing apparatus in accordance with claim 1, wherein said plurality of gas flow compensation members extend from said at least one exterior link member toward said at least one interior link member and to a point intermediate said interior and exterior link members to partially block the space present between adjacent support members.

5. The processing apparatus in accordance with claim 4, wherein said plurality of gas flow compensation members extend from said at least one exterior link member toward said at least one interior link member, with the extent to which individual compensation members extend between said exterior and interior link members varying along the length of said conveyor.

6. The processing apparatus in accordance with claim 1, wherein said plurality of gas flow compensation members are formed as cylindrical rods coupled to and extending from said at least one exterior link member to a point intermediate said interior and exterior link members to partially block the space present between adjacent support members.

7. The processing apparatus in accordance with claim 1, wherein said plurality of gas flow compensation members are formed as tapered members having a larger width end and a smaller width end, and extending from said at least one exterior link member to a point intermediate said at least one interior link member to partially block the space present between adjacent support members.

8. The processing apparatus in accordance with claim 7, wherein said plurality of gas flow compensation members have their larger width ends positioned adjacent said at least one exterior link member and said smaller width end positioned at said intermediate point to partially block the space present between adjacent support members at an outer portion of said conveyor.

9. The processing apparatus in accordance with claim 1, wherein said plurality of gas flow compensation members are formed as telescopically extending members extending from said at least one exterior link member to a point intermediate said at least one interior link member to partially block the space present between adjacent support members, and are adjustable to extend to variable intermediate positions between said exterior and interior link members.

10. The processing apparatus in accordance with claim 1, wherein said plurality of gas flow compensation members are formed as substantially trapezoidal shaped panels extend from said at least one exterior link member toward said at least one interior link member to a point intermediate said exterior and interior link members to partially block the space present between adjacent support members.

11. The processing apparatus in accordance with claim 1, wherein said plurality of gas flow compensation members are fabricated from a metallic material.

12. The processing apparatus in accordance with claim 1, wherein said plurality of gas flow compensation members are formed as shaped panels which extend from said at least one exterior link member toward said at least one interior link member to a point intermediate said exterior and interior link members to partially block the space present between adjacent support members, said shaped panels being configured to direct gas impinging thereon in a particular manner to control flow of said gaseous processing media within said chamber.

13. The processing apparatus in accordance with claim 12, wherein said plurality of gas flow compensation members are formed in an airfoil configuration to cause flow of said processing media in a direction counter to the travel of said conveyor within said chamber.

14. A conveyer for a food processing device used to process food products in a gaseous food processing media, said food processing device having an enclosed food processing chamber containing the gaseous food processing media and said enclosed food processing chamber having an inlet opening and an outlet opening, said conveyor comprising:

a plurality of interior link members;

a plurality of exterior link members;

a plurality of support members extending between said plurality of interior link members and said plurality of external link members;

a pervious food products support surface extending between adjacent support members on which the food products are placed, said conveyor transporting the food products from outside the enclosed food processing chamber through the inlet opening into the interior of the enclosed food processing chamber and through a generally helical path to expose the food products to the gaseous food processing media in the enclosed food processing chamber and out of the enclosed food processing chamber through the outlet opening; and a plurality of gas flow compensation members positioned intermediate said rod members to deflect a portion of the gaseous food processing media from the exterior portion of said conveyor toward the interior portion of said conveyor.

15. The conveyor in accordance with claim 14, wherein said pervious food products support surface consists of formed wire members having a plurality of top flat portions positioned above said support members, a plurality of bottom flat portions positioned below said support members and a plurality of loop portions intermediate said plurality of top flat portions and said plurality of bottom flat portions and said plurality of gas flow compensation members are positioned intermediate said plurality of bottom flat portions and said plurality of top flat portions.

16. The conveyor in accordance with claim 14, wherein said plurality of gas flow compensation members partially block the space between adjacent support members.

17. The conveyor in accordance with claim 14, wherein said plurality of gas flow compensation members extend from said plurality of exterior link members to a point intermediate said plurality of interior link members to partially block the space present between adjacent support members.

18. The conveyor in accordance with claim 14, wherein said plurality of gas flow compensation members are formed as cylindrical members extending from said exterior link members to a point intermediate said interior link members to partially block the space present between adjacent support members.

19. The conveyor in accordance with claim 14, wherein said plurality of gas flow compensation members are formed as tapered members having a larger width end and a smaller width end, and extending from said exterior link member to a point intermediate said interior link member to partially block the space present between adjacent support members.

20. The conveyor in accordance with claim 14, wherein said plurality of gas flow compensation members are formed as telescopically extending members and are adjustable to extend from said plurality of external link members to a variable point intermediate said plurality of internal link members and said plurality of external link members to partially block the space present between adjacent rod members.

21. The conveyor in accordance with claim 14, wherein said plurality of gas flow compensation members are formed as substantially trapezoidal shaped gas flow compensation panels and extend from said plurality of external link members to a point intermediate said plurality of internal link members and said plurality of external link members to partially block the space present between adjacent rod members.

22. A method of processing products using a gaseous processing media, said method comprising the steps of:

providing an enclosed processing chamber containing a gaseous processing media, said enclosed processing chamber having an inlet opening and an outlet opening, and including an endless conveyor having a plurality of support members extending between interior and exterior link members with a pervious products support surface extending between adjacent support members on which products are placed for processing within said chamber, moving said conveyor within said chamber through a generally helical path from said inlet to said outlet to expose products on said support surface to the gaseous processing media in said chamber, said path forming a number of superimposed tiers of said conveyor within said chamber wherein said conveyor has exterior and interior portions when traveling in said generally helical path;

providing a plurality of gas flow compensation members positioned intermediate said support members;

circulating said gaseous processing media through said number of superimposed tiers of said conveyor in a substantially vertical direction, wherein said plurality of gas flow compensation members cause deflection of a portion of the gaseous processing media from said exterior portion interior portion toward said interior portion of said conveyor.

23. The method in accordance with claim 22, wherein said plurality of gas flow compensation panels are positioned to extend from said exterior link member toward said interior link member to a point intermediate said plurality of link members to partially block the space present between adjacent support members.

24. The method in accordance with claim 22, wherein said plurality of gas flow compensation members are shaped to direct impinging gaseous processing media in a particular manner within the space between tiers of said conveyor.

25. The method in accordance with claim 24, wherein said plurality of gas flow compensation members are shaped to direct impinging gaseous processing media in a direction counter to the movement of said conveyor within said chamber.

* * * * *